(12) United States Patent
Korman et al.

(10) Patent No.: US 7,738,084 B1
(45) Date of Patent: Jun. 15, 2010

(54) FIBER OPTIC LIQUID MASS FLOW SENSOR AND METHOD

(75) Inventors: Valentin Korman, Huntsville, AL (US); Don Allen Gregory, Huntsville, AL (US); John T. Wiley, Huntsville, AL (US); Kevin W. Pedersen, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/543,284

(22) Filed: Sep. 29, 2006

(51) Int. Cl.
G01P 3/36 (2006.01)
(52) U.S. Cl. .................... 356/28; 356/28.5
(58) Field of Classification Search .............. 356/28, 356/3.01–3.15, 4.01–4.1, 5.01–5.15, 6–22, 356/28.5
See application file for complete search history.

(56) References Cited

U.S. PATENT DOCUMENTS

| | | | |
|---|---|---|---|
| 3,860,342 A * | 1/1975 | Orloff et al. .................. 356/28 |
| 4,733,962 A | 3/1988 | Brendemuehl | |
| 4,752,131 A | 6/1988 | Eisenlauer et al. | |
| 4,807,990 A | 2/1989 | Keefer | |
| 5,231,463 A | 7/1993 | Shambaugh | |
| 5,701,172 A | 12/1997 | Azzazy | |
| 5,708,495 A * | 1/1998 | Pitz et al. .................. 356/28 |
| 5,865,871 A | 2/1999 | Simundich | |
| 5,991,697 A * | 11/1999 | Nelson et al. ............... 702/49 |
| 6,013,921 A | 1/2000 | Moller et al. | |
| 6,700,130 B2 | 3/2004 | Fritz | |
| 6,874,480 B1 * | 4/2005 | Ismailov ................. 123/494 |
| 2003/0152307 A1 * | 8/2003 | Drasek et al. ............. 385/12 |
| 2004/0056197 A1 * | 3/2004 | Davidson et al. ........ 250/339.1 |
| 2005/0012935 A1 | 1/2005 | Kersey | |
| 2005/0030519 A1 * | 2/2005 | Roth .................... 356/28.5 |

OTHER PUBLICATIONS

Author Unknown, "Flow Cytometry," Wikipedia http://en.wikipedia.org/wiki/Flow_cytometry, Wikipedia Foundation (San Francisco, CA), (p. 1, 2), (Nov. 29, 2007).
Author Unknown, "How does a Flow Cytometer Work?," Unsolved Mysteries of Human Health http://unsolvedmysteries.oregonstate.edu/flow_cytometry_06.shtml, Oregon State University (Corvillis, Oregon), (p. 1, 2), (Nov. 29, 2007).

* cited by examiner

*Primary Examiner*—Thomas H Tarcza
*Assistant Examiner*—Luke D Ratcliffe
(74) *Attorney, Agent, or Firm*—James J. McGroary; Ross F. Hunt, Jr.

(57) ABSTRACT

A method and apparatus are provided for sensing the mass flow rate of a fluid flowing through a pipe. A light beam containing plural individual wavelengths is projected from one side of the pipe across the width of the pipe so as to pass through the fluid under test. Fiber optic couplers located at least two positions on the opposite side of the pipe are used to detect the light beam. A determination is then made of the relative strengths of the light beam for each wavelength at the at least two positions and based at least in part on these relative strengths, the mass flow rate of the fluid is determined.

18 Claims, 3 Drawing Sheets

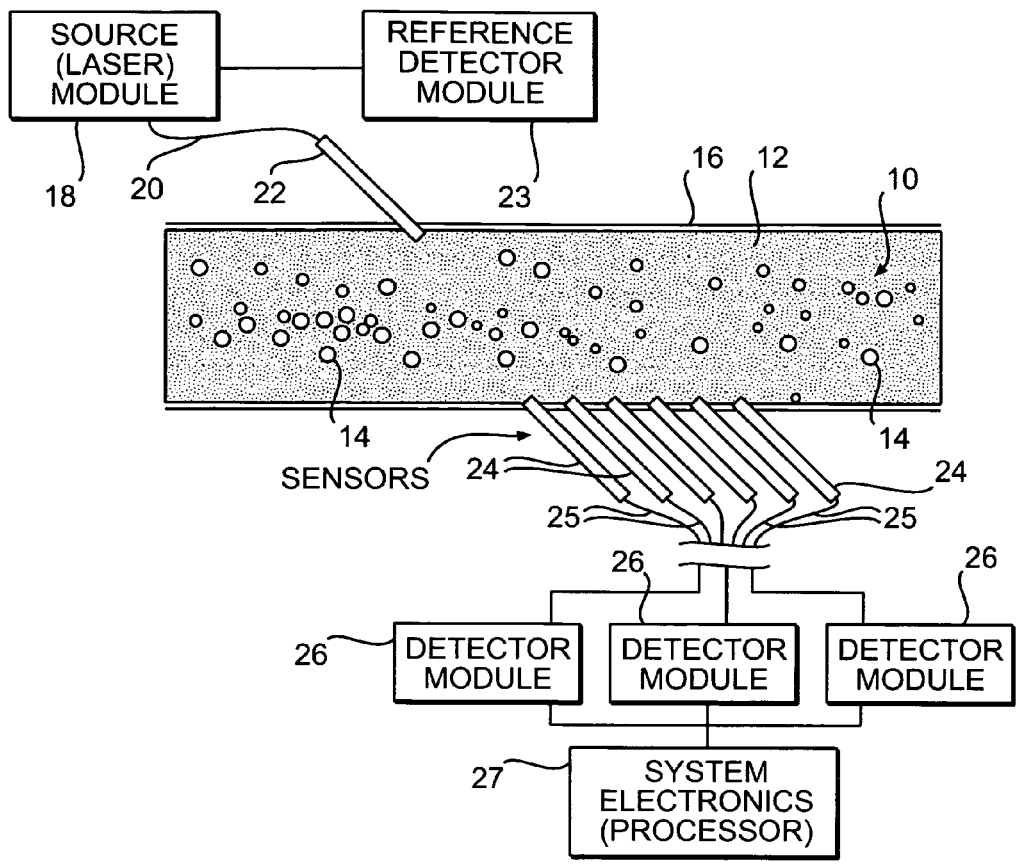
FIG. 1
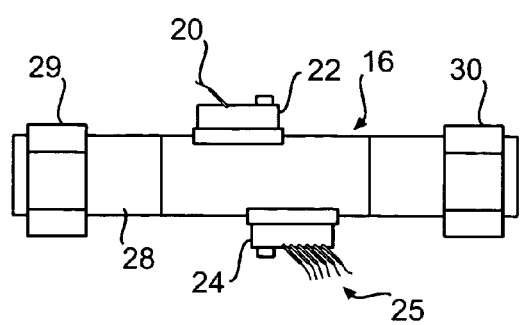 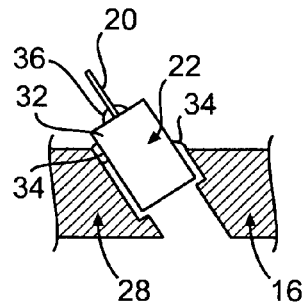
FIG. 2  FIG. 3

FIBER OPTIC LIQUID MASS FLOW SENSOR AND METHOD

ORIGIN OF THE INVENTION

The invention described herein was made in performance of work under a NASA contract and by an employee of the United States Government and is subject to the provisions of Section 305 of the National Aeronautics and Space Act of 1958, as amended, Public Law 85-568 (72 Stat. 435; 42 U.S.C. §2457), and 35 U.S.C. §202, and may be manufactured and used by the Government of the United States of America for governmental purposes without the payment of any royalties thereon or therefore. In accordance with 35 U.S.C. §202, the Contractor elected not to retain title.

FIELD OF THE INVENTION

The present invention relates to the measurement of fluid mass flow and, more particularly, to the measurement of fluid mass flow in cryogenic systems, although the invention is not limited to this application.

BACKGROUND OF THE INVENTION

Cryogenic systems are used throughout industry and research alike. Although the invention is not limited to such an application, of particular interest here is the application of cryogenic systems to space-related propulsion research. In this regard, most types of propulsion research rely heavily on the use of cryogenic fluids. Generally, these fluids include liquid oxygen ($O_2$), liquid nitrogen ($N_2$) and liquid hydrogen ($H_2$). These cryogenic fluids are used for a variety of propulsion related requirements, such as cooling and combustion fuel/additives.

Cryogenic systems usually operate at high flow or nozzle pressures. For example, flow rates of up to 16 liters per second are common in pipes with 5 centimeter diameters. Fundamental data on physical attributes within the cryogenic liquid flow are difficult to measure. In this regard, even basic questions such as how much cryogenic liquid is actually traveling through the system are difficult to answer. At the operating temperatures of these cryogenic systems there is a constant mixing between the gaseous and liquid states. This can lead to turbulent flow and cavitation and make flow measurement difficult.

Current techniques for determining mass flow assume that there is no turbulence, which also precludes the presence of any gaseous medium in the flow. Due to the very nature of the low temperatures involved, the basic, conventional engineering measurement techniques normally used are either not available or inapplicable, or, if used, are error ridden. These conventional techniques include the use of direct contact thermocouple and thermoresistor measurements, as well as of flow-driven mechanical flow meters.

SUMMARY OF THE INVENTION

Broadly speaking, the present invention provides a noninvasive approach to fluid flow measurements that does not directly sample physical properties of the cryogenic flow and thus does not suffer the disadvantages of the conventional engineering approaches discussed above.

According to one aspect of the invention, there is provided a method for sensing the mass flow rate of a fluid flowing through a pipe, the method comprising:

projecting a light beam of at least two wavelengths from one side of the pipe across the width of the pipe so as to pass through the fluid under test;

detecting the light beam at least two positions on the opposite side of the pipe separated by a known distance along the pipe;

determining the relative strengths of the light beam for each wavelength at each of the at least two positions; and determining, based at least in part on said relative strengths, the mass flow rate of the fluid.

Preferably, the method further comprises directly detecting said light beam outside of the pipe to provide reference, and using said reference in determining the mass flow rate.

Preferably, separate light sources are used to produce the at least two wavelengths, and at least one optical splitter is used to produce the light beam containing the at least two wavelengths. Advantageously, the separate light sources comprise laser diodes, and photodiodes are used to detect said light beam. In a beneficial implementation, here of the laser diodes are used, and the three laser diodes emit light at wavelengths of 1330 nm, 830 nm and 660 nm, respectively. Preferably, two optical splitters are used with the three laser diodes to produce a projected beam containing all three of the respective wavelengths. Advantageously, the optical splitters comprise 50/50 multimode fiber splitters. Preferably, the photodiodes comprise one InGaAs photodiode and two silicon photodiodes.

In accordance with a further aspect of the invention, there is provided a mass flow sensor for determining the mass flow rate of a fluid flowing in a pipe, said mass flow sensor comprising:

a light source for producing a beam of light containing a plurality of individual wavelengths;

a first optical coupler mounted on one side of the pipe for coupling the light beam into fluid flowing in the pipe so the light beam passes through the fluid and is dispersed thereby;

at least two further optical couplers mounted on the opposite side of the pipe at longitudinally spaced positions therealong so as to receive the dispersed light beam after transmission thereof through the fluid;

at least two light detectors, coupled respectively to the at least two optical couplers, for receiving the dispersed light beam and for producing corresponding electrical outputs; and means for processing the electrical outputs produced by the at least two detectors and for producing an output related to the mass flow rate of the fluid in the pipe.

Preferably, the light source comprises a plurality of laser diodes each producing light at one of said individual wavelengths. Preferably, the light source further comprises combining means for combining the light produced by said laser diodes into the light beam coupled into the fluid. Advantageously, the combining means comprises at least one optical splitter. In an advantageous implementation, the plurality of laser diodes comprises three laser diodes which emit light at three different wavelengths comprising 1330 nm, 830 nm and 660 nm, respectively, and said combining means comprises two optical splitters. Preferably, the optical splitters comprise 50/50 multimode fiber splitters. The at least two light detectors preferably comprise three photodiodes. Advantageously, the three photodiodes comprise one InGaAs photodiode and two silicon photodiodes.

Preferably, the optical couplers include at least one lens mounted in a wall of the pipe and connected to a fiber optic cable. In an advantageous implementation, the at least one lens comprises a first gradient index microlens connected to the fiber optic cable, and a cylindrical lens disposed inwardly of the microlens and extending perpendicular thereto.

According to yet another aspect of the invention, there is provided a mass flow meter for determining the mass flow rate of cryogenic fluids, the flow meter comprising:

a laser light source including a plurality of laser diodes for producing light at a plurality of different individual wavelengths, combining means for combining the different wavelengths of light to produce a light output containing the different wavelengths; and a light coupler, mounted on one side of a flow pipe through which a cryogenic fluid flows, for coupling a light beam, derived from said light output and containing said different wavelengths, into the cryogenic fluid for transmission through the cryogenic fluid so as to be dispersed thereby;

a plurality of light detectors, located on the opposite side of the flow pipe at spaced locations therealong, for receiving dispersed light resulting from transmission of the light beam through the cryogenic fluid, each of said light detectors including separating means for separating the dispersed light into said individual wavelengths, and a plurality of photodiodes, equal in number to the number of individual wavelengths, for receiving light of one of said wavelengths and producing a corresponding electrical output; and means for processing the outputs of the photodiodes of each of said light detectors and for producing, based thereon, an output related to mass fluid flow of the cryogenic fluid.

Preferably, the plurality of laser diodes comprises three laser diodes, the combining means comprises a first pair of optical splitters, the separating means of each of said light detectors comprises a second pair of optical splitters, and the photodiodes of each of said light detectors comprise three photodiodes.

Further features and advantages of the present invention will be set forth in, or apparent from, the detailed description of preferred embodiments thereof which follows.

BRIEF DESCRIPTION OF THE DRAWINGS

FIG. 1 is a schematic representation, partially in block diagram form, of a mass flow measurement system in accordance with one preferred embodiment of the invention;

FIG. 2 is a side elevational view of one preferred embodiment of a measurement pipe section corresponding to that of FIG. 1;

FIG. 3 is a cross-sectional view of one embodiment of the optical couplers of FIG. 1;

DESCRIPTION OF THE PREFERRED EMBODIMENTS

Figure 4:
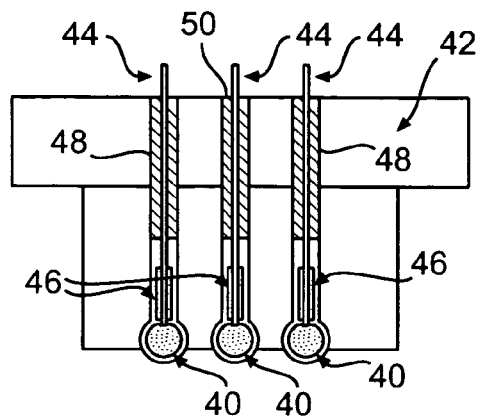
FIG. 4 is a cross-sectional view of a further, preferred embodiment of the optical couplers of FIG. 1.

Referring to FIG. 1, there is shown a highly schematic representation, partially in block diagram form, of a flow meter constructed in accordance with one preferred embodiment of the invention.

A two-phase flow is indicated at 10 which, in this application of the invention, includes liquid oxygen 12 and gaseous oxygen 14. It will, of course, be appreciated that flow 10 would normally be contained in a pipe or like flow containment, as indicated at 16, and it will be understood that the term "pipe" as used herein is intended to embrace any and all such flow containments.

A source (laser) module 18 is connected by a fiber optic connection or cable 20 to an optical coupler 22 mounted on pipe 16 so as to transmit laser light into and through the two-phase flow 10 to further optical couplers or sensors 24. Couplers 24 are mounted in opposed relation to coupler 22 and in longitudinally offset positions from coupler 22 relative to pipe 16. In some embodiments, the number and positions of sensors 24 are variable as is indicated by the multiple sensors shown. Source module 18 is also connected to a reference detector module 23.

In a preferred embodiment, the outputs of the couplers or sensors 24 are connected through fiber optic connections or cables 25 to respective detector modules 26 which detect the laser light received at different positions along the flow 10 and convert the light received into respective electrical outputs.

In the illustrated embodiment, three such detector modules 26 are shown although the number of detectors may vary. Detectors 26 (as well as reference detector 23) are connected to a system electronics unit (processor) 27, described in more detail below.

As shown in FIG. 2, in one preferred embodiment, the optical couplers 22 and 24 are mounted in longitudinally offset relation on a pipe section 28 corresponding to pipe 16. Pipe section 28 includes fittings 29 and 30 on opposite ends thereof for enabling connection of pipe section 28 in a piping arrangement for the cryogenic fluid under test.

It will be appreciated that the mechanical interface between optical couplers 22 and 24 and pipe section 28 employed in coupling light into and out of pipe section 28 must be of a rugged construction, particularly in embodiments involving cryogenic fluids, in order to withstand the forces associated with the temperature and pressure environment necessary for such cryogenic fluids. In this regard, the embedded optics of couplers 22 and 24 must be mated with fiber optic cables 20 and 25 which provide a convenient means of signal transmission to and from the laser module 18 and detector modules 26.

Referring to FIG. 3, one embodiment of an optical coupler arrangement is shown, wherein optical coupler 22 comprises a gradient index (GRIN) microlens 32 mounted in pipe section 28. A GRIN lens is fundamentally a BK7-type glass which, in use, collimates the output of fiber optic 20 (or facilitates coupling into such a fiber optic). The thermal expansion, or more correctly in this case, the thermal contraction, is much lower than the stainless steel preferably used for pipe section 28. A commercial adhesive or epoxy indicated at 34 and having a lower temperature limit of −40 C (about 233 K) can be used to mount lens 32 in pipe section 28. For example, a common adhesive used for bonding optical (glass) materials to metal or glass substrates is NORLAND™ 61 UV cure epoxy. Another useful epoxy is a two part epoxy AE-15.

In one exemplary implementation, the optical fiber 20 was connected to lens 34 by baring the end of the fiber (by, e.g., using a ruby scribe) and placing the epoxy, indicated at 36 in FIG. 3, in an uncured state between lens 34 and the cleaved fiber. Ultraviolet illumination is then used to cure the epoxy as provided by the manufacturer's recommendations. Next, the fiber is pulled through a furcation sleeve (not shown) and a FC fiber connector connected manually and hand polished.

In a further, currently preferred embodiment illustrated in FIG. 4, a further, cylindrical lens, denoted 40, is also used. In FIG. 4, the coupling optics are mounted in an opto-mechanical housing 42 and the optical fibers are denoted 44 and the GRIN lenses are denoted 46. Threading 48 is used along with an epoxy fill 80 to secure the elements in place. The axis of cylindrical lens 40 extends perpendicularly to that of the corresponding GRIN lens 46 so that FIG. 4 is an end view of the lenses 40. In this regard, a GRIN lens produces a near collimated beam that expands symmetrically in azimuth angle (for ideal alignment). This inherently leads to higher loss since only the optical energy that falls on the receiving GRIN lens (i.e., the GRIN lens of the corresponding optical coupler 24) has any chance of making it back into the corresponding detector. Beam divergence is necessary in the direction along the axis of the pipe 16 (pipe section 28). Thus, any energy off of this axis is wasted. To contrast this, the cylindrical lens 40 reflects the light from the corresponding GRIN lens 46 to form a line image, and the otherwise wasted energy is channeled into a line along the pipe length. In one preferred embodiment, cylindrical lenses 40 are formed by quartz rods.

Figure 5:
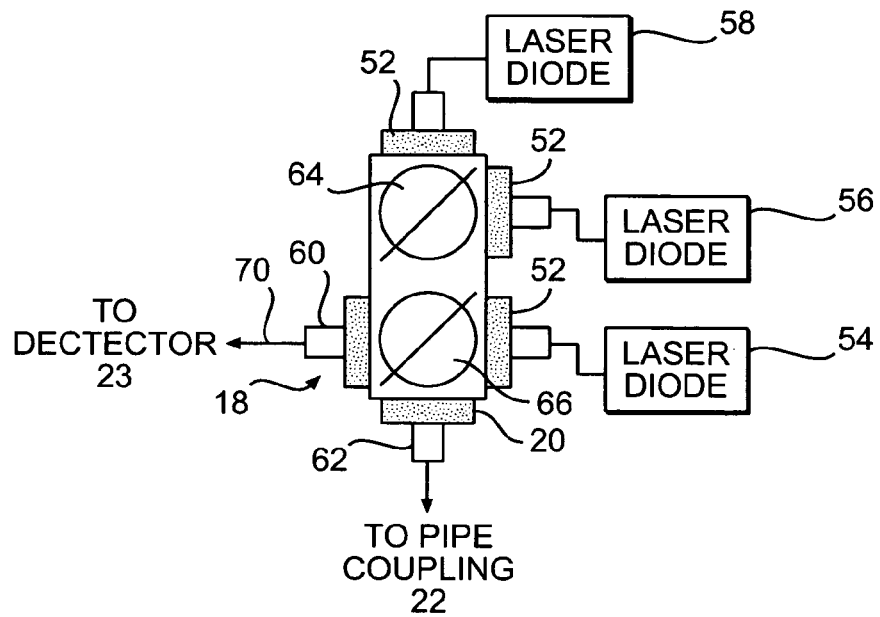
FIG. 5 is a schematic representation of the source module of FIG. 1 in accordance with a first embodiment.

Referring to FIG. 5, there is shown a schematic diagram of source module 18 of FIG. 1. Fiber collimators 52 are used to connect three sections of module 18 to three different laser diode assemblies denoted 54, 56 and 58. The laser diodes 54, 56 and 58 produce laser beams at wavelengths of 660 nm, 830 nm and 1330 nm, respectively. One output 60 of module 18 is connected to reference detector module 23 which was mentioned above and which is used to monitor laser power, while another output 62 is connected to multimode fiber cable 20 and thence to the pipe interface formed by coupler 22. Module 18 also includes a pair of beam splitters 64 and 66 which form part of a three-axis mount.

In one embodiment, the free-space laser beams were selectively steered using cut-off filters centered at 750 nm and 1000 nm, respectively, and formed by beam splitters 64 and 66. Laser light with a wavelength below the filter cut-off passes freely through the filter while light with a higher wavelength will be reflected and not passed through. In this embodiment, two filters (beam splitters 64 and 66) are used that straddle the three laser diode wavelengths and thus provide for coupling and separation of the laser sources.

In a modified, more preferred embodiment, the 1000 nm filter is replaced with a 50/50 plate beam splitter. This change provides an additional tap 60 containing all three wavelengths, and this tap 60 is connected to an optical fiber 70 and fed to detector module 23 as a reference, as shown in FIG. 5. A further, currently preferred embodiment is discussed below in connection with FIG. 7.

Figure 6:
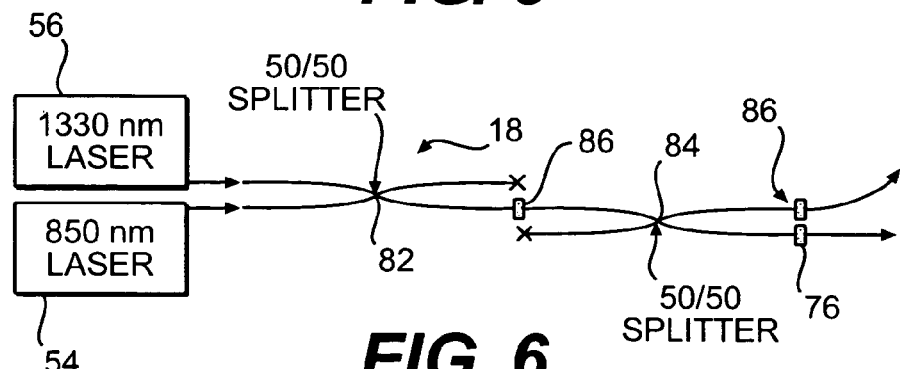
FIG. 6 is a schematic representation of the source module of FIG. 1 in accordance with a further embodiment.

Before considering the further embodiment of source 18, reference is made to FIG. 6 which shows a preferred embodiment of one detector module 26. The detector from input fiber optic cable 25 includes light at all three wavelengths (660 nm, 830 nm and 1330 nm). A pair of cut-off filters (beam splitters) 72 and 74 with frequency cut-offs at 1000 nm and 750 nm, respectively, extract the three frequencies, beginning at the highest, for delivery to a first photodiode 76, preferably in the form of a silicon PIN photodiode, a second photodiode 78, also in the form of a silicon PIN photodiode, and a third photodiode 80, preferably in the form of a InGaAs photodiode.

Figure 7:
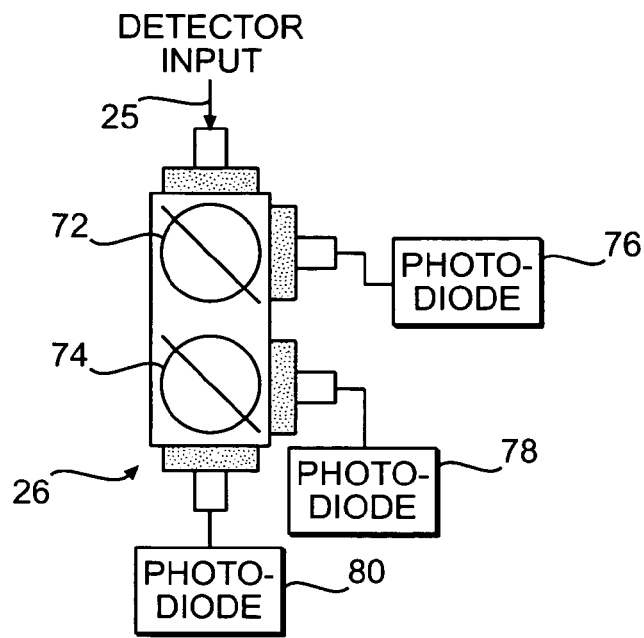
FIG. 7 is a schematic representation of one preferred embodiment of one of the detector modules of FIG. 1.

Referring now to FIG. 7, another currently preferred embodiment of laser source 18 is illustrated. In this embodiment, a pair of 50/50 fiber splitters 82 and 84 are arranged in a cascading fashion. This overcomes a disadvantage of the free-space technique for wavelength multiplexing and demultiplexing described above. This embodiment also includes FC to FC couplers as indicated at 36.

Figure 8:
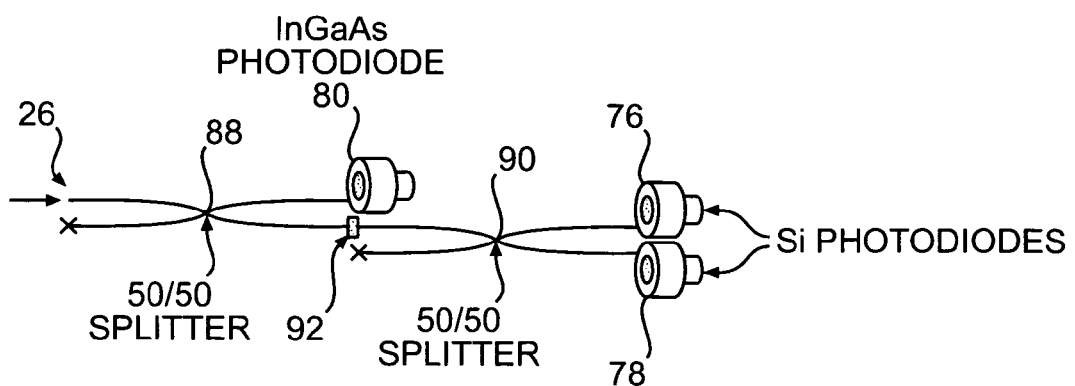
FIG. 8 is a schematic representation of a further embodiment of one of the detector modules of FIG. 1.

The corresponding detector module 18, which is preferably used with the embodiment of FIG. 7, is shown in FIG. 8. This embodiment also uses a pair of 50/50 fiber splitters 88 and 90. A FC to FC coupler is indicated at 92.

A key difference between the embodiments of FIGS. 7 and 8 and the other embodiments is that the wavelengths are not separated within the fiber splitters 82 and 84, i.e., each separated fiber contains all of the wavelengths in the same ratios as were sent to the detector module 26. The demultiplexing process can thus be carried out using an algorithm rooted in the difference in response from the different wavelengths in the different materials of the photodiode detectors. To explain, consider an example wherein a signal is carried in a detector fiber with the optical powers distributed as follows: A % for the 1330 nm wavelength and B % for the 830 nm wavelength. Thus, the total power within any segment of the fiber can be accounted for by the formula $A+B=100\%$. Based on the response curve of a Si photodiode (corresponding to photodiodes 76 and 78), the 1330 nm wavelength is not detected, so that the Si photodiode will provide a value for B. Similarly, the response in InGaAs material (the material of photodiode 80) is known relative to the two wavelengths. The relative response, for example NB, will not change as long as the material does not change. Thus, by relying on the fixed response ratio of the InGaAs material and an independent measurement of the Si material, the total power values can be separated and determined with little pre-test calibration. More importantly, the losses associated with the all-fiber, all-detector demultiplexing technique of FIGS. 7 and 8 are very much lower (by an estimated factor of $10^4$) than those of the free space method.

In all embodiments, the light received by photodiodes 76, 78 and 80 is used to determine the scattering interactions and, in particular, the light dispersion in the fluid (e.g., cryogenic liquid). The individual outputs are averaged and this determination is then related to mass flow rate. Thus, in general, the optical interactions with the fluid medium are used to determine density and hence enable application of a basic mass flow calculation.

Although the invention has been described above in relation to preferred embodiments thereof, it will be understood by those skilled in the art that variations and modifications can be effected in these preferred embodiments without departing from the scope and spirit of the invention.

What is claimed:

1. A method for sensing the mass flow rate of a fluid flowing through a pipe, said method comprising:
    projecting a single beam of light containing light of at least two wavelengths from one side of the pipe across the width of the pipe so as to pass through the fluid under test;
    detecting the light beam at least two positions on the opposite side of the pipe separated by a known distance along the pipe;
    determining the relative strengths of the light beam for each wavelength at each of the at least two positions; and
    determining, based at least in part on said relative strengths, the mass flow rate of the fluid.

2. A method as claimed in claim 1 further comprising directly detecting said light beam outside of the pipe to provide reference, and using said reference in determining the mass flow rate.

3. A method as claimed in claim 1 wherein separate light sources are used to produce the at least two wavelengths, and wherein at least one optical splitter is used to produce the light beam containing the at least two wavelengths.

4. A method as claimed in claim 3 wherein the separate light sources comprise laser diodes, and wherein photodiodes are used to detect said light beam.

5. A method as claimed in claim 4 wherein three of said laser diodes are used and said three laser diodes emit light at wavelengths of 1330 nm, 830 nm and 660 nm, respectively.

6. A method as claimed in claim 5 wherein two optical splitters are used with the three laser diodes to produce a projected beam containing all three of the respective wavelengths.

7. A method as claimed in claim 6 wherein said splitters comprise 50/50 multimode fiber splitters.

8. A method as claimed in claim 5 wherein said photodiodes comprise one InGaAs photodiode and two silicon photodiodes.

9. A mass flow sensor for determining the mass flow rate of a fluid flowing in a pipe, said mass flow sensor comprising:
- a light source for producing a single beam of light containing a plurality of individual wavelengths;
- a first optical coupler mounted on one side of the pipe for coupling the light beam into fluid flowing in the pipe so the light beam passes through the fluid and is dispersed thereby;
- at least two further optical couplers mounted on the opposite side of the pipe at longitudinally spaced positions therealong so as to receive the dispersed light beam after transmission thereof through the fluid;
- at least two light detectors, coupled respectively to the at least two optical couplers, for receiving the dispersed light beam and for producing corresponding electrical outputs;
- means for processing the electrical outputs produced by the at least two detectors and for producing an output indicative of the mass flow rate of the fluid in the pipe, said light source comprising a plurality of laser diodes each producing light at one of said individual wavelengths; and said light source further comprises combining means for combining the light produced by said laser diodes into the single beam of light coupled into the fluid.

10. A sensor as claimed in claim 9 wherein said combining means comprises at least one optical splitter.

11. A sensor as claimed in claim 10 wherein said plurality of laser diodes comprises three laser diodes which emit light at three different wavelengths comprising 1330 nm, 830 nm and 660 nm, respectively, and said combining means comprises two optical splitters.

12. A sensor as claimed in claim 11 wherein said optical splitters comprise 50/50 multimode fiber splitters.

13. A sensor as claimed in claim 11 wherein said at least two light detectors comprise three photodiodes.

14. A sensor as claimed in claim 12 wherein said three photodiodes comprise one InGaAs photodiode and two silicon photodiodes.

15. A sensor as claimed in claim 9 wherein said optical couplers include at least one lens mounted in a wall of the pipe and connected to a fiber optic cable.

16. A sensor as claimed in claim 15, wherein said at least one lens comprises a first gradient index microlens connected to the fiber optic cable and a cylindrical lens disposed inwardly of the microlens and extending perpendicular thereto.

17. A mass flow meter for determining the mass flow rate of cryogenic fluids, said flow meter comprising:
- a laser light source including a plurality of laser diodes for producing light at a plurality of different individual wavelengths, combining means for combining the different wavelengths of light to produce a light output containing the different wavelengths; and a light coupler, mounted on one side of a flow pipe through which a cryogenic fluid flows, for coupling a single beam of light, derived from said light output and containing said different wavelengths, into the cryogenic fluid for transmission through the cryogenic fluid so as to be dispersed thereby;
- a plurality of light detectors, located on the opposite side of the flow pipe at spaced locations therealong, for receiving dispersed light resulting from transmission of the light beam through the cryogenic fluid, each of said light detectors including separating means for separating the dispersed light into said individual wavelengths, and a plurality of photodiodes, equal in number to the number of individual wavelengths, for receiving light of one of said associated wavelengths and producing a corresponding electrical output; and
- means for processing the outputs of the photodiodes of each of said light detectors and for producing, based thereon, an output indicative of mass fluid flow of the cryogenic fluid.

18. A flow meter as claimed in claim 17 wherein said plurality of laser diodes comprises three laser diodes, said combining means comprises a first pair of optical splitters, said separating means of each of said light detectors comprises a second pair of optical splitters, and said photodiodes of each of said light detectors comprises three photodiodes.

\* \* \* \* \*